US012356145B2

(12) United States Patent
Tachi

(10) Patent No.: US 12,356,145 B2
(45) Date of Patent: Jul. 8, 2025

(54) SPEAKER DISPLACEMENT DETECTION CALIBRATION METHOD AND SPEAKER DISPLACEMENT DETECTION APPARATUS

(71) Applicant: Alps Alpine Co., LTD., Tokyo (JP)

(72) Inventor: Ryosuke Tachi, Fukushima (JP)

(73) Assignee: Alps Alpine Co., LTD., Tokyo (JP)

( * ) Notice: Subject to any disclaimer, the term of this patent is extended or adjusted under 35 U.S.C. 154(b) by 341 days.

(21) Appl. No.: 17/977,078

(22) Filed: Oct. 31, 2022

(65) Prior Publication Data

US 2023/0140328 A1 May 4, 2023

(30) Foreign Application Priority Data

Nov. 1, 2021 (JP) ................................ 2021-178918

(51) Int. Cl.
*H04R 1/32* (2006.01)
*H04R 5/04* (2006.01)

(52) U.S. Cl.
CPC ............... *H04R 1/323* (2013.01); *H04R 5/04* (2013.01)

(58) Field of Classification Search
CPC .......... H04R 1/323; H04R 5/04; H04R 3/002; H04R 3/04; H04R 29/001; H04R 3/08; H04R 3/007; H04R 29/003; G01L 1/242
See application file for complete search history.

(56) References Cited

U.S. PATENT DOCUMENTS

| | | | | |
|---|---|---|---|---|
| 12,035,115 B2* | 7/2024 | Saito | ...................... | H04R 3/007 |
| 2016/0302018 A1* | 10/2016 | Russell | ................... | G01L 1/242 |
| 2018/0324538 A1* | 11/2018 | Russell | ................ | H04R 29/003 |

FOREIGN PATENT DOCUMENTS

| | | | | |
|---|---|---|---|---|
| JP | 2007060648 A * | 3/2007 | ............... | H04R 3/08 |
| JP | 2008-228214 | 9/2008 | | |
| JP | 2010-124026 | 6/2010 | | |
| WO | WO-2007013622 A1 * | 2/2007 | ............... | H04R 3/08 |

OTHER PUBLICATIONS

Extended European Search Report issued Mar. 13, 2023 in corresponding European Patent Application No. 22201186.8.

* cited by examiner

*Primary Examiner* — Angelica M McKinney
(74) *Attorney, Agent, or Firm* — Crowell & Moring LLP

(57) ABSTRACT

A magnetic angle sensor outputs a component Vs in a Y direction where a vibration system of a synthetic vector of a magnetic vector of a magnetic circuit of a speaker and a magnetic vector of a displacement detection magnet fixed on the vibration system and a component Vc in an X direction orthogonal to the Y direction. A test signal is applied to the speaker, and collection of (Vs, Vc) and a measurement of a Y-direction displacement of the vibration system by a displacement meter are performed. A conversion equation "z=a1×Vs+a2×Vc" for the first principle component is obtained by principle component analysis on collected (Vs, Vc), and a conversion equation "y=b1×z2+b2×z+b3" for conversion to a displacement y is obtained by polynomial regression on the Y-direction displacement y of the displacement detection magnet obtained from a measurement value of the displacement meter and z calculated from collected (Vs, Vc).

6 Claims, 4 Drawing Sheets

SPEAKER DISPLACEMENT DETECTION CALIBRATION METHOD AND SPEAKER DISPLACEMENT DETECTION APPARATUS

RELATED APPLICATION

The present application claims priority to Japanese Patent Application Number 2021-178918, filed Nov. 1, 2021 the entirety of which is hereby incorporated by reference.

BACKGROUND

1. Field of the Disclosure

The present disclosure relates to a technique of detecting a displacement of a vibration system of a speaker.

2. Description of the Related Art

As a technique of detecting a displacement of a vibration system of a speaker, a technique of detecting a displacement of a vibration system of a speaker using a sensor incorporated in a speaker has been used (refer to JP 2008-228214A and JP 2010-124026A).

According to the technique of detecting a displacement of a vibration plate of a speaker by a sensor incorporated in the speaker, a displacement detection error is generated depending on a degree of accuracy of assembly associated with a position and a direction of the sensor relative to the speaker, and therefore, the displacement may not be accurately detected.

Therefore, the present disclosure provides a more accurate detection of a displacement of a vibration system of a speaker.

SUMMARY

Accordingly, it is an object of the present disclosure to provide a displacement detection calibration method of a speaker for calibrating a conversion equation for converting, while it is determined that a component in a Y direction is Vs and a component in an X direction that is orthogonal to the Y direction is Vc of a synthetic vector obtained by synthesizing a magnetic vector of a magnetic circuit of the speaker and a magnetic vector of a magnet fixed on a vibration system of the speaker, (Vs, Vc) output from a sensor fixed on a non-vibration system of the speaker into a displacement of the vibration system. The displacement detection calibration method includes collecting (Vs, Vc) output from the sensor by applying a predetermined test signal to the speaker, and in addition, measuring a displacement in the Y direction of the vibration system, calculating a conversion equation from (Vs, Vc) to a first principle component z by performing principle component analysis on the corrected Vs, Vc), performing, which it is determined that a displacement in the Y direction of the magnet obtained from a measurement value of a displacement meter, polynomial regression on the relationship between the displacement y and z calculated from the corrected (Vs, Vc) so as to calculate a conversion equation for converting z to the displacement y; and setting an equation equivalent to an equation obtained by assigning a conversion equation for converting the calculated (Vs, Vc) into the first principle component z to a conversion equation for converting the calculated z to the displacement y as a conversion equation for converting (Vs, Vc) output from the sensor into a displacement of the vibration system.

Furthermore, it is an object of the present disclosure to provide a displacement detection calibration method of a speaker for calibrating a conversion equation for converting, while it is determined that a component in a Y direction is Vs and a component in an X direction that is orthogonal to the Y direction is Vc of a synthetic vector obtained by synthesizing a magnetic vector of a magnetic circuit of the speaker and a magnetic vector of a magnet fixed on a vibration system of the speaker, (Vs, Vc) output from a sensor fixed on a non-vibration system of the speaker into a displacement of the vibration system. The displacement detection calibration method includes collecting (Vs, Vc) output by the sensor when a predetermined test signal is applied to the speaker, calculating a conversion equation from (Vs, Vc) to a first principle component z by performing principle component analysis on the corrected Vs, Vc), performing, which it is determined that a displacement in the Y direction of the magnet obtained when the test signal calculated using a model obtained by modeling the speaker is y, polynomial regression on the relationship between the displacement y and z calculated from the corrected (Vs, Vc) so as to calculate a conversion equation for converting z to the displacement y, and setting an equation equivalent to an equation obtained by assigning a conversion equation for converting the calculated (Vs, Vc) into the first principle component z to a conversion equation for converting the calculated z to the displacement y as a conversion equation for converting (Vs, Vc) output from the sensor into a displacement of the vibration system.

Here, in some implementations of the displacement detection calibration method described above, a conversion equation for converting (Vs, Vc) to the first principle component z may be "z=a1×Vs+a2×Vc" as a value for obtaining a1 and a2 by the principle component analysis, and a conversion equation for converting z to the displacement y may be "y=b1×z2+b2×z+b3" as a value for obtaining b1, b2, and b3 by the polynomial regression.

Furthermore, according to implementations of the present disclosure, a displacement detection device of a speaker that detects a displacement of a vibration system of the speaker includes a magnet fixed on the vibration system of the speaker, a sensor fixed on a non-vibration system of the speaker, the sensor outputting (Vs, Vc), when it is determined that a component in a Y direction is Vs and a component in an X direction that is orthogonal to the Y direction is Vc of a synthetic vector obtained by synthesizing a magnetic vector of a magnetic circuit of the speaker and a magnetic vector of the magnet, and a displacement calculation section that calculates a displacement in a Y direction of the non-vibration system of the speaker, when it is determined that a first principle component obtained by principle component analysis performed on (Vs, Vc) is z, in accordance with a conversion equation for converting z into y that is a displacement in the Y direction of the magnet.

Moreover, implementations of the present disclosure further provide a speaker unit that includes the displacement detection device and the speaker in an integrated manner.

According to implementations of the displacement detection calibration method and the displacement detection device described above, the first principle component z having a high contribution rate (a rate in which information is not lost due to one-dimensionalizing performed to obtain the first principle component z) may be calculated irrespective of a fixing error of a magnet and a sensor for each speaker, a conversion equation for accurately converting the first principle component (Vs, Vc) to a displacement of the vibration system may be set.

DETAILED DESCRIPTION

Hereinafter, an embodiment of the present disclosure will be described.

Figure 1:
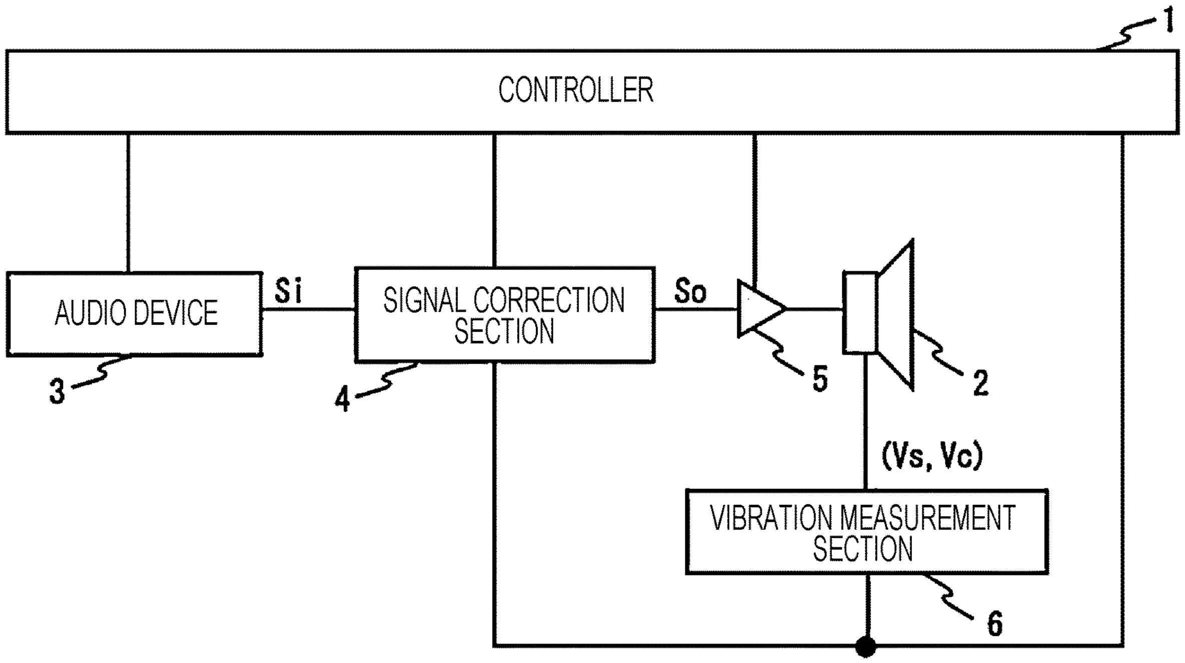
FIG. 1 is a diagram illustrating a configuration of one form of an acoustic system according to the present disclosure.

FIG. 1 is a diagram illustrating one form of a configuration of an acoustic system.

As illustrated in FIG. 1, the acoustic system includes a controller 1, a speaker 2, an audio device 3 that outputs an input signal Si that is an audio signal, a signal correction section 4 that corrects the input signal Si so as to output an output signal So, an amplifier 5 for driving the speaker 2 using the output signal So as an input, and a vibration measurement section 6 that measures a vibration displacement of a vibration system of the speaker 2.

Figure 2A:
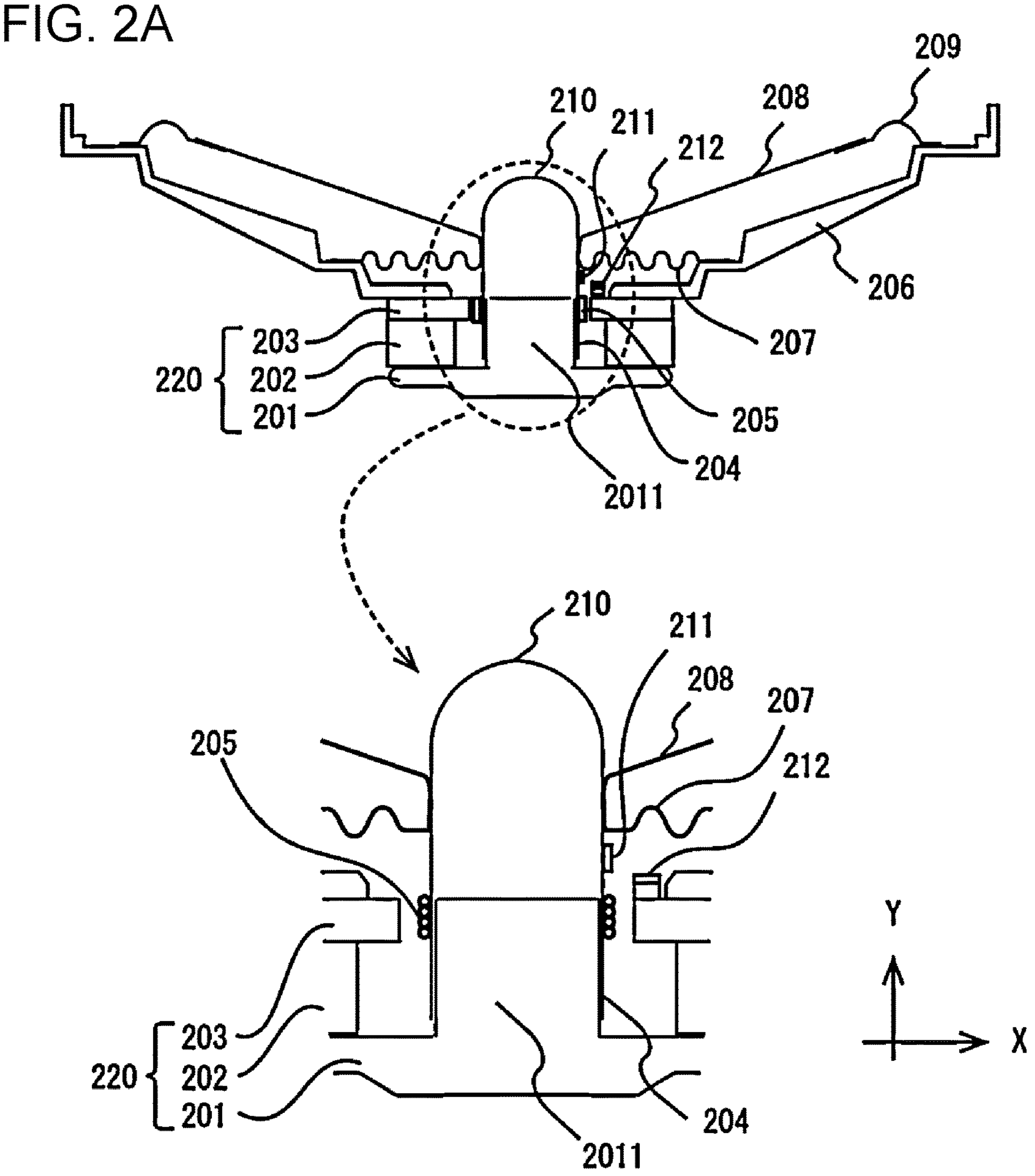
FIGS. 2A and 2B are diagrams illustrating one form of a configuration of a speaker according to the present disclosure.

FIG. 2A is a diagram illustrating one form of a configuration of the speaker 2.

As illustrated in FIG. 2A, the speaker 2 includes a yoke 201, a magnet 202, a top plate 203, a voice coil bobbin 204, a voice coil 205, a frame 206, a damper 207, a vibration plate 208, an edge 209, and a dust cap 210.

Assuming that an upper side in FIG. 2A corresponds to a front side of a front speaker and a lower side in FIG. 2A corresponds to a rear side of the front speaker, the yoke 201 has a protrusion portion 2011, at a center, that protrudes forward, and the magnet 202 of a ring shape is disposed on an outer peripheral of the protrusion portion 2011, and the top plate 203 of a ring shape is disposed on the magnet 202. Then the top plate 203 is formed of a member having conductivity, such as iron. The yoke 201, the magnet 202, and the top plate 203 constitute a magnetic circuit 220.

The voice coil bobbin 204 has a hollow cylindrical shape, and the voice coil 205 to which a signal is to be applied from the amplifier 5 is wound around the voice coil bobbin 204. Furthermore, the protrusion section 2011 of the yoke 201 is inserted in a hollow of the voice coil bobbin 204 from a rear side so that the voice coil bobbin 204 is movable in a front-and-rear direction relative to the yoke 201, and the voice coil 205 is disposed in a position between the protrusion portion 2011 of the yoke 201 and the top plate 203. A magnetic flux generated between an inner peripheral edge of the top plate 203 by the magnetic circuit 220 passes through the position.

The vibration plate 208 has a shape similar to a side surface of a truncated cone having a height direction substantially corresponding to a front-and-rear direction of a front speaker. The vibration plate 208 has an outer peripheral edge portion coupled with a front-end portion of the frame 206 through the edge 209. Furthermore, the vibration plate 208 has an inner peripheral edge portion fixed at a front-end portion of the voice coil bobbin 204.

With this configuration of the speaker 2, when the amplifier 5 applies a signal on the voice coil 205, the voice coil bobbin 204 vibrates in a front-and-rear direction in accordance with an amplification of an audio signal due to electromagnetic action between magnetism generated by the magnetic circuit 220 and the audio signal supplied through the voice coil 205. When the voice coil bobbin 204 vibrates, the vibration plate 208 coupled with the voice coil bobbin 204 vibrates so that sound corresponding to a signal supplied from the amplifier 5 is generated.

Next, assuming that an axis direction of the speaker 2 corresponds to a Y direction and a radial direction corresponds to an X direction as illustrated in the drawing, a displacement detection magnet 211 and a magnetic angle sensor 212 are disposed on such a speaker 2 to detect a displacement of the vibration plate 208 in the Y direction.

The displacement detection magnet 211 is fixed on the voice coil bobbin 204 so as to be moved in a vertical direction together with the voice coil bobbin 204, and the magnetic angle sensor 212 is fixed on the top plate 203 or the like such that a position thereof is not changed relative to the magnetic circuit 220.

Figure 2B:
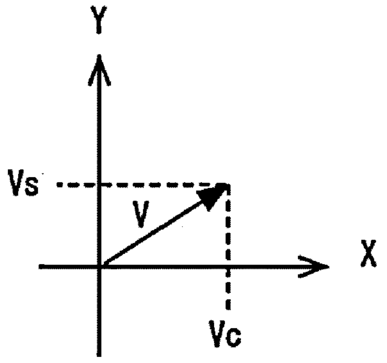

Then the magnetic angle sensor 212 detects a magnitude of a Y-direction component and a magnitude of an X-direction component of a synthetic vector V obtained by synthesizing a magnetic vector generated by the magnetic circuit 220 and a magnetic vector generated by the displacement detection magnet 211 as illustrated in FIG. 2B, and outputs a Y detection value Vs indicating the magnitude of the Y-direction component and an X detection value Vc indicating the magnitude of the X-direction component to the vibration measurement section 6.

Here, a magnitude and a direction of the synthetic vector V obtained by synthesizing the magnetic vector generated by the magnetic circuit 220 and the magnetic vector generated by the displacement detection magnet 211 (a combination of a magnitude of the Y-direction component and a magnitude of the X-direction component) is changed in accordance with a Y-direction displacement of the displacement detection magnet 211 caused by a displacement of the voice coil bobbin 204, and therefore, a Y-direction displacement amount of the vibration system of the speaker 2 can be calculated using the Y detection value Vs and the X detection value Vc.

Referring back to FIG. 1, a displacement conversion equation for converting the Y detection value Vs and the X detection value Vc into the Y-direction displacement amount of the vibration system of the speaker 2 is set to the vibration measurement section 6 in advance as described in detail below.

Then, the vibration measurement section 6 calculates the Y-direction displacement amount of the vibration system of the speaker 2 by assigning the Y detection value Vs and the X detection value Vc output from the magnetic angle sensor 212 to the displacement conversion equation. Furthermore, the vibration measurement section 6 detects various vibration states of the vibration system of the speaker 2 using the calculated displacement amount.

The signal correction section 4 corrects the input signal Si using a transfer characteristic in which a deviation of an output of the speaker 2 relative to the input signal Si is cancelled with reference to the vibration states of the vibration system of the speaker 2 measured by the vibration measurement section 6 and outputs a resultant signal as the output signal So to the amplifier 5.

Then, the controller 1 integrally controls operations of the sections in accordance with a user operation or an external environment.

Hereinafter, an operation of setting the displacement conversion equation to the vibration measurement section 6 performed in advance as described above will be described.

Figure 3:
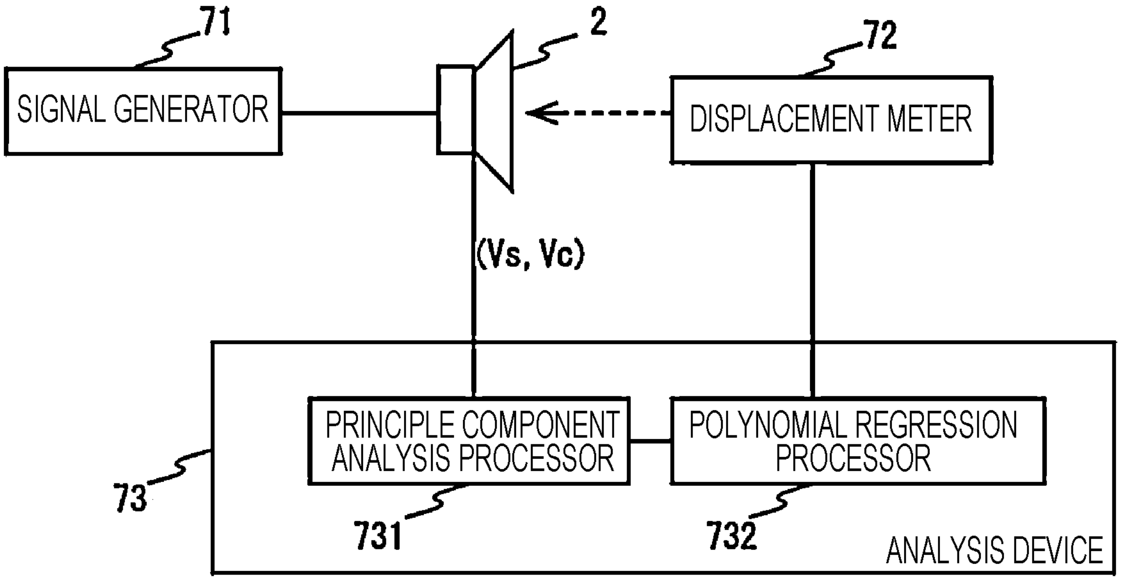
FIG. 3 is a diagram illustrating one form of a configuration for a calculation of a displacement conversion equation according to the present disclosure.

The displacement conversion equation is calculated using a configuration illustrated in FIG. 3.

As illustrated in the drawing, this configuration includes a signal generator 71 that outputs a test signal of a sine wave or a sweep sine wave to the speaker 2 incorporating the displacement detection magnet 211 and the magnetic angle sensor 212, a displacement meter 72 that measures a Y-direction displacement of the vibration system, such as the vibration plate 208, of the speaker 2, and an analysis device 73.

Here, a laser displacement meter or the like may be used as the displacement meter 72, for example.

Furthermore, the analysis device 73 includes a principle component analysis processor 731 and a polynomial regression processor 732.

Figure 4A:
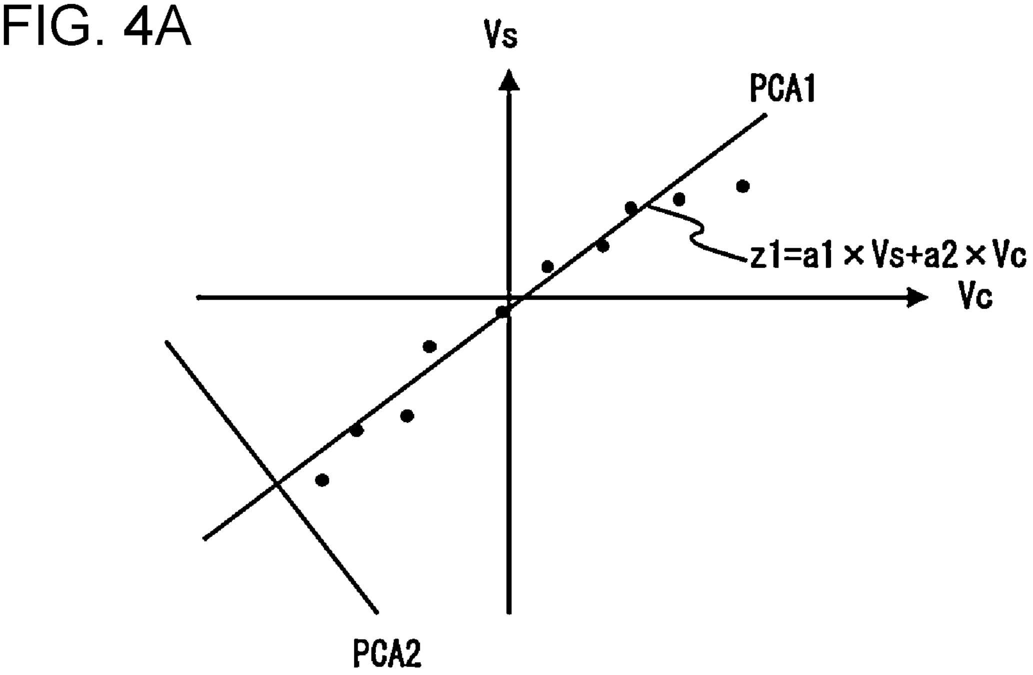
FIGS. 4A and 4B are diagrams illustrating one form of a procedure of the calculation of the displacement conversion equation according to the present disclosure.

The principle component analysis processor 731 collects a pair (Vs, Vc) of the Y detection value Vs and the X detection value Vc output from the magnetic angle sensor 212 for the test signal and obtains a first principle component z(PCA1) by principle component analysis. Specifically, when pairs (Vs, Vc) indicated by black dots in FIG. 4A are collected, for example, a first principle component z(PCA1) as illustrated in FIG. 4A is obtained.

$$z=a1\times Vs+a2\times Vc \qquad \text{Equation (1)}$$

Here, a1 and a2 are obtained under a condition of "a12+a22=1" such that a variance of z obtained based on Equation (1) for the collected pairs (Vs, Vc) becomes maximum.

In Equation (1) where a1 and a2 are obtained, z is obtained by one-dimensionalizing a two-dimensional pair (Vs, Vc) so that lost information is as less as possible.

Here, since Vs and Vc are originally two orthogonal components of one vector, a contribution rate (a rate in which information is not lost due to one-dimensionalizing performed to obtain the first principle component z) of the first principle component z obtained by the variance of z obtained for the collected pairs (Vs, Vc) based on Equation (1) is sufficiently high irrespective of a fixing error of the displacement detection magnet 211 and the magnetic angle sensor 212 for each speaker 2. Since the contribution rate of the first principle component z is sufficiently high, a calculation of the Y-direction displacement amount of the vibration system of the speaker 2 using z is substantially the same as a calculation of the displacement amount using the pairs (Vs, Vc).

Subsequently, the polynomial regression processor 732 generates (y, z) data by combining a distance y between the magnetic angle sensor 212 and the displacement detection magnet 211 that is obtained from a displacement of the vibration plate 208 measured by the displacement meter 72 on the test signal and z obtained by Equation (1) for the collected pairs (Vs, Vc). It is assumed that the relationship between y and z to be combined as (y, z) is as follows: a time point of a measurement of a displacement used to obtain y by the displacement meter 72 is the same as a time point of an output of a pair (Vs, Vc) used for the calculation of z by the magnetic angle sensor 212.

Figure 4B:
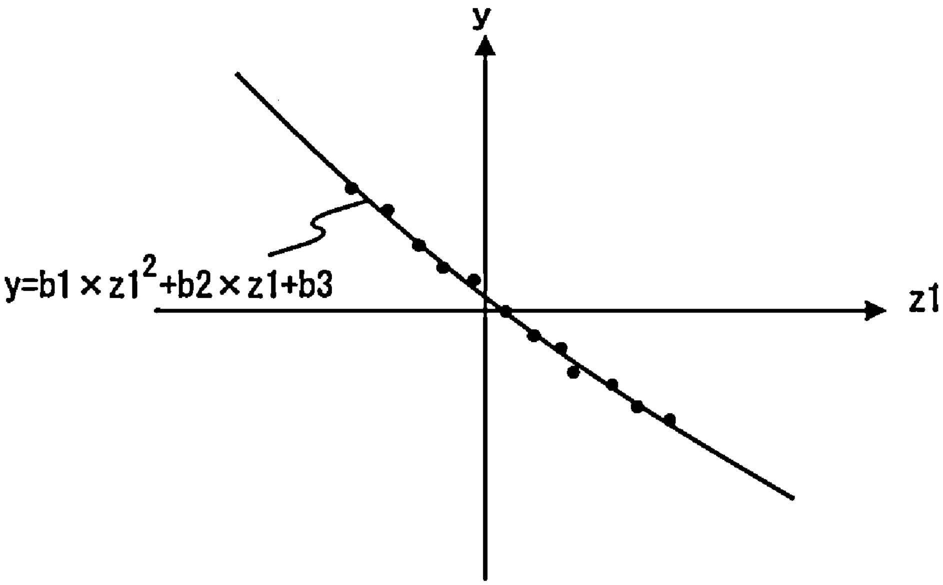

Then the polynomial regression is performed on (y, z) data so that a quadratic polynomial of z representing y is obtained. Specifically, when (y, z) indicated by black dots as illustrated in FIG. 4B are obtained, for example, the following equation is calculated as illustrated in FIG. 4B.

$$y=b1\times z^2+b2\times z+b3 \qquad \text{Equation (2)}$$

Here, Equation (2) is the quadratic polynomial since a magnetic force of the displacement detection magnet 211 measured by the magnetic angle sensor 212 is in inverse proportion to a square of a distance between the displacement detection magnet 211 and the magnetic angle sensor 212, and therefore, (y, z) data appropriately returns to the quadratic polynomial.

In the polynomial regression, b1, b2, and b3 are obtained as values that minimize a means square error of (y, z) data relative to Equation (2) using the least-square method, for example.

Then, Equation (3) is obtained as follows by assigning Equation (1) to z1 of Equation (2) that has been obtained.

$$y=b1\times(a1\times Vs+a2\times Vc)^2+b2\times(a1\times Vs+a2\times Vc)+b3 \qquad \text{Equation (3)}$$

Equation (3) is set as a displacement conversion equation to the vibration measurement section 6 of the acoustic system employing the speaker 2.

Thus, one embodiment of the present disclosure has been described.

Here, although a Y-direction displacement of the vibration system of the speaker 2 is measured using the displacement meter 72 in the foregoing embodiment, a Y-direction displacement of the vibration system obtained for a test signal may be calculated based on a model obtained by modeling the speaker 2 and the calculated displacement may be used instead of the displacement measured by the displacement meter 72.

Note that, in the foregoing embodiment, the vibration measurement section 6 and the signal correction section 4 may be integrally configured with the speaker 2 as a speaker unit.

Furthermore, the contribution rate of the first principle component z calculated as described above and the square mean error of (y, z) data relative to Equation (2) may be used for evaluation, such as a discrimination of fabrication failure of each speaker 2. Furthermore, estimation of various characteristics of the speaker 2 may be performed, such as a zero point of the speaker 2, using a vibration state of the vibration system of the speaker 2 represented by the displacement y obtained for the test signal based on Equation (3).

Although embodiments and implementations of the present disclosure have been described in detail above, the present disclosure is not limited to the specific embodiments, and various modifications and changes can be made within the scope of the disclosure set forth in the claims. Therefore, it is intended that this disclosure not be limited to the particular embodiments disclosed, but that the disclosure will include all embodiments falling within the scope of the appended claims.

What is claimed is:

1. A displacement detection calibration method of a speaker for calibrating a conversion equation for converting, when the method determines that a component in a Y direction is Vs and a component in an X direction that is orthogonal to the Y direction is Vc of a synthetic vector obtained by synthesizing a magnetic vector of a magnetic circuit of the speaker and a magnetic vector of a magnet fixed on a vibration system of the speaker, Vs, Vc output from a sensor fixed on a non-vibration system of the speaker into a displacement of the vibration system, the displacement detection calibration method comprising:

collecting the Vs, Vc output from the sensor by applying a predetermined test signal to the speaker, and in addition, measuring a displacement in the Y direction of the vibration system;

calculating the conversion equation from Vs, Vc to a first principle component z by performing principle component analysis on a corrected Vs, Vc;

performing, when the method determines that a displacement in the Y direction of the magnet obtained from a measurement value of a displacement meter, polynomial regression on a relationship between the displacement in the Y direction of the magnet and the first principle component z calculated from the corrected Vs, Vc to calculate the conversion equation for converting the first principle component z to the displacement in the Y direction of the magnet; and setting an equation equivalent to an equation obtained by assigning the conversion equation for converting the calculated Vs, Vc into the first principle component z to a conversion equation for converting the calculated first principle component z to the displacement in the Y direction of the magnet as the conversion equation for converting Vs, Vc output from the sensor into the displacement of the vibration system.

2. The displacement detection calibration method according to claim 1, wherein:

the conversion equation for converting Vs, Vc to the first principle component z is represented as z=a1×Vs+a2×Vc as a value for obtaining a1 and a2 by the principle component analysis, and the conversion equation for converting the first principle component z to the displacement in the Y direction of the magnet is represented as y=b1×z2+b2×z+b3 as a value for obtaining b1, b2, and b3 by the polynomial regression.

3. A displacement detection calibration method of a speaker for calibrating a conversion equation for converting, when the method determines that a component in a Y direction is Vs and a component in an X direction that is orthogonal to the Y direction is Vc of a synthetic vector obtained by synthesizing a magnetic vector of a magnetic circuit of the speaker and a magnetic vector of a magnet fixed on a vibration system of the speaker, Vs, Vc output from a sensor fixed on a non-vibration system of the speaker into a displacement of the vibration system, the displacement detection calibration method comprising:

collecting the Vs, Vc output by the sensor when a predetermined test signal is applied to the speaker;

calculating the conversion equation from Vs, Vc to a first principle component z by performing principle component analysis on the corrected Vs, Vc;

performing, when it is determined that a displacement in the Y direction of the magnet obtained when the test signal calculated using a model obtained by modeling the speaker is y, polynomial regression on a relationship between the displacement in the Y direction of the magnet and the first principle component z calculated from the corrected Vs, Vc so as to calculate the conversion equation for converting the first principle component z to the displacement in the Y direction of the magnet; and setting an equation equivalent to an equation obtained by assigning the conversion equation for converting the calculated Vs, Vc into the first principle component z to the conversion equation for converting the calculated the first principle component z to the displacement in the Y direction of the magnet as the conversion equation for converting Vs, Vc output from the sensor into the displacement of the vibration system.

4. The displacement detection calibration method according to claim 3, wherein:

the conversion equation for converting Vs, Vc to the first principle component z is represented as z=a1×Vs+a2×Vc as a value for obtaining a1 and a2 by the principle component analysis, and the conversion equation for converting the first principle component z to the displacement y is represented as y=b1×z2+b2×z+b3 as a value for obtaining b1, b2, and b3 by the polynomial regression.

5. A displacement detection device of a speaker configured to detect a displacement of a vibration system of the speaker, the displacement detection device comprising:

a magnet fixed on the vibration system of the speaker;

a sensor fixed on a non-vibration system of the speaker, the sensor configured to output Vs, Vc, when the sensor determines that a component in a Y direction is Vs and a component in an X direction that is orthogonal to the Y direction is Vc of a synthetic vector obtained by synthesizing a magnetic vector of a magnetic circuit of the speaker and a magnetic vector of the magnet; and a controller configured to calculate a displacement in a Y direction of the non-vibration system of the speaker, when the controller determines that a first principle component obtained by principle component analysis performed on Vs, Vc is z, in accordance with a conversion equation for converting the first principle component z into y that is a displacement in a Y direction of the magnet.

6. A speaker unit that includes the displacement detection device according to claim 5 and the speaker in an integrated manner.

* * * * *